US012601177B2

(12) United States Patent
Shaw

(10) Patent No.: US 12,601,177 B2
(45) Date of Patent: *Apr. 14, 2026

(54) DECORATIVE CONCRETE WITH UNIFORM SURFACE AND METHOD OF FORMING THE SAME

(71) Applicant: Shaw & Sons, Inc., Costa Mesa, CA (US)

(72) Inventor: Ronald D. Shaw, Costa Mesa, CA (US)

(73) Assignee: SHAW & SONS, INC., Costa Mesa, CA (US)

( * ) Notice: Subject to any disclaimer, the term of this patent is extended or adjusted under 35 U.S.C. 154(b) by 189 days.

This patent is subject to a terminal disclaimer.

(21) Appl. No.: 18/471,201

(22) Filed: Sep. 20, 2023

(65) Prior Publication Data

US 2024/0011291 A1      Jan. 11, 2024

Related U.S. Application Data

(63) Continuation of application No. 17/308,912, filed on May 5, 2021, now abandoned, which is a continuation (Continued)

(51) Int. Cl.
*B24B 1/00*          (2006.01)
*B24B 7/22*          (2006.01)
(Continued)

(52) U.S. Cl.
CPC .................. *E04C 2/06* (2013.01); *B24B 7/22* (2013.01); *B28B 1/14* (2013.01); *B28B 11/001* (2013.01); *B28B 11/04* (2013.01); *B28B 11/044* (2013.01); *B28B 11/08* (2013.01); *B28B 11/0809* (2013.01); *B28B 11/0818* (2013.01); *B28B 11/0845* (2013.01); *B28B*

*11/0872* (2013.01); *B28B 11/245* (2013.01); *B28B 19/0007* (2013.01); *B28B 23/02* (2013.01); *B29C 71/0009* (2013.01); *B44C 1/221* (2013.01); *B44C 1/222* (2013.01); *C04B 28/02* (2013.01); *C04B 41/009* (2013.01); *C04B 41/53* (2013.01); *C04B 41/5323* (2013.01); *C04B 41/533* (2013.01); *C04B 41/72* (2013.01); *E04C 2/044* (2013.01); *E04F 21/24* (2013.01); *B29L 2031/10* (2013.01); *E04C 2002/005* (2013.01);
(Continued)

(58) Field of Classification Search
CPC .......... B24B 1/00; B28B 1/14; B28B 11/001; B28B 11/06; B28B 11/0809; B28B 11/0818; B28B 11/0845; B28B 11/0872; B28B 11/245; B29C 71/0009; B44C 1/221; B44C 1/222; B44C 1/223; C04B 41/53; C04B 41/533
USPC .................. 264/31, 129, 131, 162, 333, 341
See application file for complete search history.

(56) References Cited

U.S. PATENT DOCUMENTS

| | | |
|---|---|---|
| 3,217,617 A | 11/1965 | Wiswell |
| 3,406,618 A | 10/1968 | Bradshaw |

(Continued)

*Primary Examiner* — Leo B Tentoni
(74) *Attorney, Agent, or Firm* — Stetina Garred Brucker & Newboles

(57) ABSTRACT

A decorative concrete with a very uniform finish surface and a method of fabricating the same is disclosed. A concrete mixture is poured over a subgrade which defines an exposed surface. The exposed surface is finished with any of several techniques, and the surface is then worked with an abrasive material, and additional techniques are used to color and seal the concrete.

13 Claims, 3 Drawing Sheets

Related U.S. Application Data of application No. 15/922,481, filed on Mar. 15, 2018, now Pat. No. 11,028,582, which is a continuation of application No. 15/097,634, filed on Apr. 13, 2016, now abandoned.

(51) Int. Cl.

| | |
|---|---|
| *B28B 1/14* | (2006.01) |
| *B28B 11/00* | (2006.01) |
| *B28B 11/04* | (2006.01) |
| *B28B 11/06* | (2006.01) |
| *B28B 11/08* | (2006.01) |
| *B28B 11/24* | (2006.01) |
| *B28B 19/00* | (2006.01) |
| *B28B 23/02* | (2006.01) |
| *B29C 71/00* | (2006.01) |
| *B44C 1/22* | (2006.01) |
| *C04B 28/02* | (2006.01) |
| *C04B 41/00* | (2006.01) |
| *C04B 41/53* | (2006.01) |
| *C04B 41/72* | (2006.01) |
| *E04C 2/04* | (2006.01) |
| *E04C 2/06* | (2006.01) |
| *E04F 21/24* | (2006.01) |
| *B29L 31/10* | (2006.01) |
| *E04C 2/00* | (2006.01) |

(52) U.S. Cl.
CPC .......... *E04F 21/245* (2013.01); *E04F 21/247* (2013.01); *E04F 21/248* (2013.01)

(56) References Cited

U.S. PATENT DOCUMENTS

| | | | |
|---|---|---|---|
| 3,457,210 | A | 7/1969 | Markus |
| 3,797,867 | A | 3/1974 | Hartl |
| 4,748,788 | A | 6/1988 | Shaw |
| 5,024,029 | A | 6/1991 | Abbott |
| 5,125,953 | A | 6/1992 | Gattner |
| 5,237,781 | A | 8/1993 | Demetrius |
| 5,246,650 | A | 9/1993 | Clark |
| 5,794,401 | A | 8/1998 | Shaw et al. |
| 5,975,985 | A | 11/1999 | Sutherland |
| 6,016,635 | A | 1/2000 | Shaw |
| 6,033,146 | A | 3/2000 | Shaw |
| 6,238,277 | B1 | 5/2001 | Duncan |
| 6,385,940 | B1 | 5/2002 | Maier |
| 7,322,772 | B2 | 1/2008 | Shaw |
| 7,591,967 | B2 | 9/2009 | Palermo |
| 7,607,859 | B2 | 10/2009 | Shaw |
| 7,614,820 | B2 | 11/2009 | Shaw et al. |
| 7,670,081 | B2 | 3/2010 | Shaw |
| 7,781,019 | B2 | 8/2010 | Shaw et al. |
| 8,079,775 | B2 | 12/2011 | Shaw et al. |
| D662,523 | S | 6/2012 | Goentzel |
| 8,936,411 | B1 | 1/2015 | Shaw |
| 9,579,764 | B1 | 2/2017 | Wetherell |
| 9,580,915 | B2 | 2/2017 | Shaw |
| 9,695,602 | B2 | 7/2017 | Shaw |
| 9,790,693 | B2 | 10/2017 | Wilde |
| 2003/0140594 | A1 | 7/2003 | Shaw |
| 2005/0238429 | A1 | 10/2005 | Kipp |
| 2007/0071550 | A1 | 3/2007 | Shaw |
| 2007/0164484 | A1 | 7/2007 | Piccolo |
| 2007/0187873 | A1 | 8/2007 | Bailey |
| 2010/0180528 | A1 | 7/2010 | Shaw |
| 2011/0121484 | A1 | 5/2011 | Gunther |
| 2013/0125504 | A1 | 5/2013 | Brailsford |
| 2014/0000214 | A1 | 1/2014 | Vasquez, Jr. |
| 2017/0275893 | A1 | 9/2017 | Shaw |
| 2017/0298626 | A1 | 10/2017 | Shaw |
| 2017/0334032 | A1 | 11/2017 | Yagur |

DECORATIVE CONCRETE WITH UNIFORM SURFACE AND METHOD OF FORMING THE SAME

CROSS-REFERENCE TO RELATED APPLICATIONS

The present application is a continuation of U.S. patent application Ser. No. 17/308,912, filed on May 5, 2021 and now abandoned, which is a continuation of U.S. patent application Ser. No. 15/922,481, filed on Mar. 15, 2018, now U.S. Pat. No. 11,028,582, issued on Jun. 8, 2021, which is a continuation of U.S. patent application Ser. No. 15/097,634, filed on Apr. 13, 2016 and now abandoned, the entire disclosures of which are expressly incorporated herein by reference.

STATEMENT RE: FEDERALLY SPONSORED RESEARCH/DEVELOPMENT

Not Applicable

BACKGROUND

Field of the Invention

The present invention relates in general to concrete products, and more particularly, to a method of creating decorative concrete with a highly uniform surface and the method of forming the same.

Description of the Related Art

As is well known in the building and construction trade, concrete is extensively utilized as a building material for commercial and residential applications. In this regard, due to its durability, water resistance, and cost economy, concrete has gained widespread use. With this widespread use, there is a demand for decorative concrete that possesses improved aesthetics such as a highly uniform surface.

Although numerous methods of concrete finishing have been developed in prior art, such as salt finish, broom finish, and form pressed finish (i.e. stamp concrete), the use of such conventional techniques have typically failed to provide the desired result, i.e. aesthetics, of the resultant concrete surface to be highly uniform. In this regard, although techniques have been developed to provide a more uniform concrete, such attempts have been generally difficult or costly to install. Further, such prior art methods have typically focused on working the concrete before hardening by surface treating the concrete with additional material while the concrete is still in a plastic state.

As such, there exists a need in the art for decorative concrete with a highly uniform finish, as well as an economical method of forming the same. Various aspects of the present invention are specifically directed toward addressing these particular needs as will be discussed in more detail below.

BRIEF SUMMARY

The present invention is best understood by reference to the following detailed description when read in conjunction with the accompanying drawings.

Disclosed is a method of forming a decorative concrete surface having a highly uniform exposed surface, preferably including preparing a subgrade, pouring a concrete mixture over the subgrade, the concrete mixture defining the exposed surface when poured, applying a finish technique to the exposed surface, working the exposed surface with an abrasive compound and applying a surface retarder to the exposed surface. Subsequent to the surface retarder being applied to the exposed surface, a vapor barrier may be formed on the exposed surface.

The method further may include the steps of washing the surface film, curing the concrete with water, and power washing the top surface. The method can further include sand blasting; acid washing; and/or applying aggregate to the top surface of the concrete.

After the concrete has hardened, the method utilizes an abrasive, such as a low grit sandpaper, which is applied to the top surface of the concrete. Preferably the sandpaper comprises a twenty grit sanding disc which may be mechanically or manually run over the top surface of the concrete. Although intuitively the application of a low grit sandpaper on the top surface of the concrete would seem to make the top surface of the concrete uneven and/or rough, the applicant has found that it actually evens out the sand particles creating a more uniform finish on the top surface of the concrete.

Following the abrasive sanding application, the top surface of the concrete may optionally be provided with conventional surface treatment, such as concrete stain and/or concrete sealers as desired. The method of the present invention can be utilized for both new concrete installations and is suitable for use on nearly all concrete finishing techniques, such as brooming finish, hand trowel finish, sand blast finish, stamp concrete finish, or acid wash finishes. Further, the present invention is additionally suitable for use on existing concrete installations as a retrofit application to improve the uniformity and aesthetics of the top surface of existing concrete installations.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
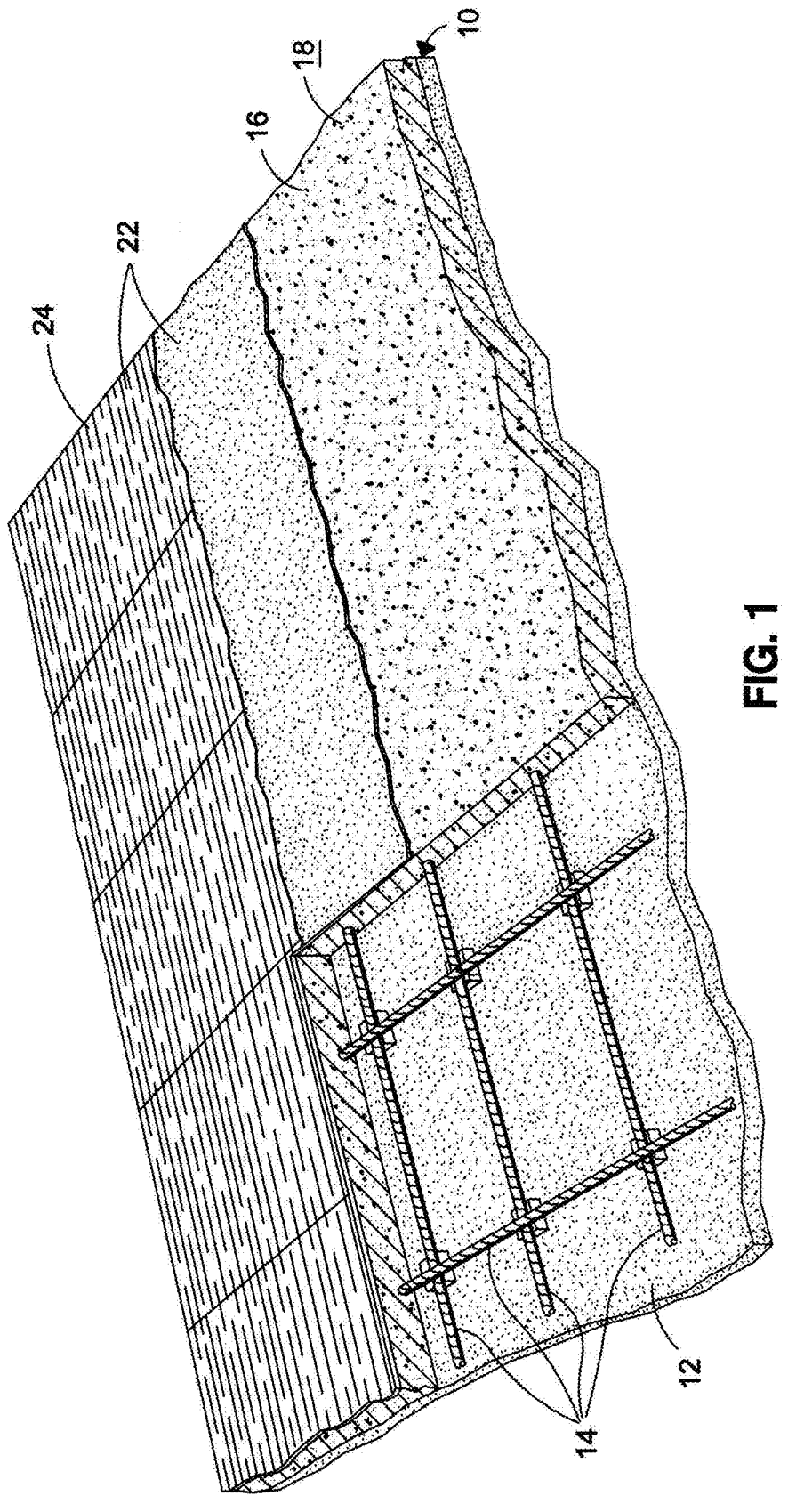
FIG. 1 illustrates a perspective cross sectional view of the decorative concrete structure of the present disclosure.
Figure 2:
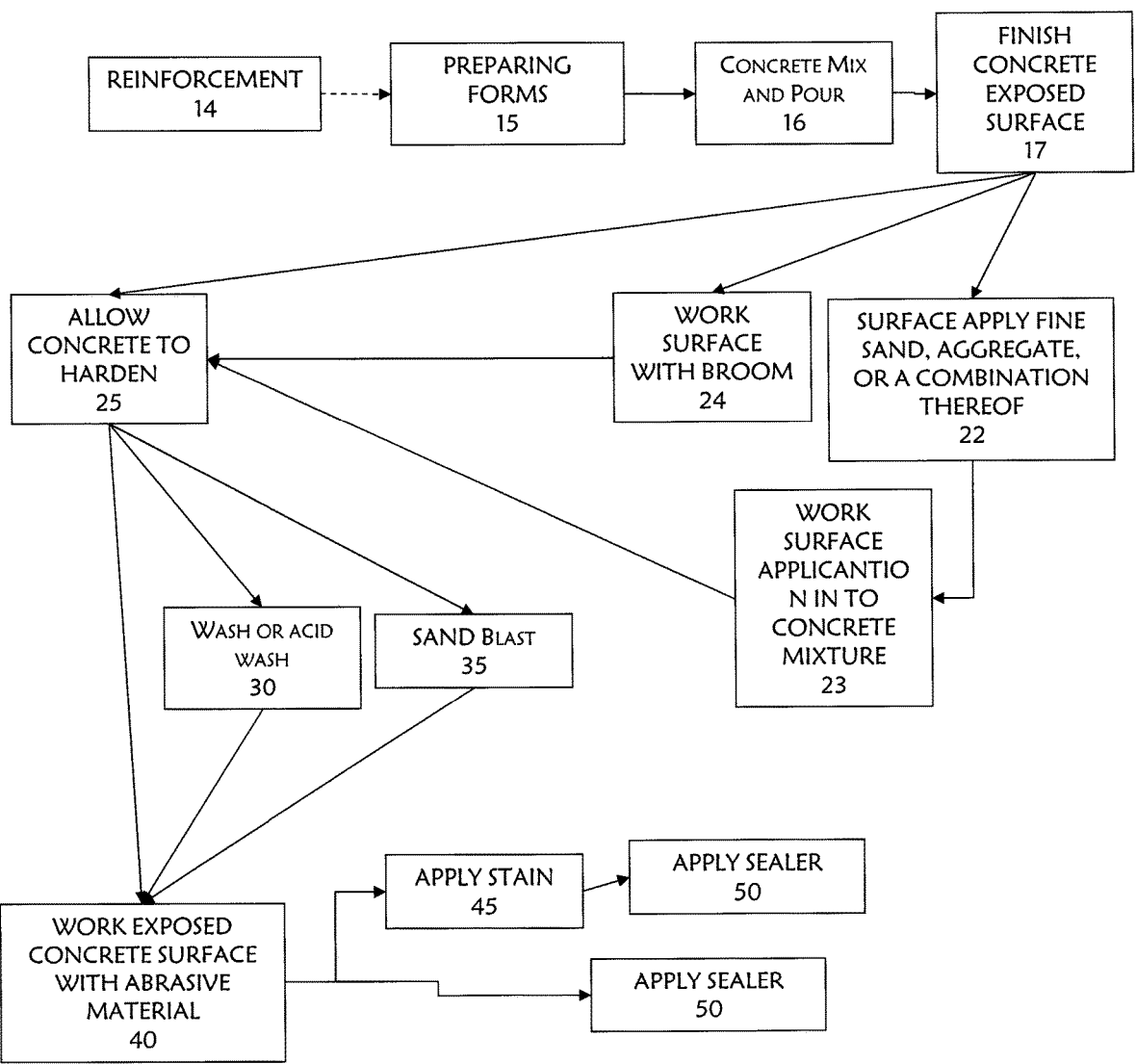
FIG. 2 illustrates the method of forming the decorative concrete.

Referring first to FIGS. 1 and 2, the decorative concrete structure 10 of the present invention providing a highly uniform surface and the method for preparing a decorative concrete structure 10 is shown. Various aspects of preparing the decorative concrete structure 10 result in a decorative concrete structure 10 which provides a highly uniform surface of the concrete.

An initial step in forming the decorative concrete structure 10 may optionally comprise preparing a subgrade 8. The subgrade 8 may provide uniform support for the decorative concrete structure 10. Typically, the initial step involves excavating the ground to a desired elevation and compacting the ground preferably to 90% compaction to ensure a uniform and stable support. After compacting the subgrade 8, the subgrade may be covered with a layer of clean, moist, fill sand 12 which preferably defines a minimum thickness of approximately four inches. Although the fill sand 12 is not necessary for the method of producing the decorative concrete structure 10, it is desirable to control the hydration process of the decorative concrete structure 10.

After preparing the subgrade 8, should such a preparation be required or optionally chosen, conventional forms or form members may be placed around the perimeter of the designated pour area 15 to create a cavity within which the concrete mixture 16 is poured. As is well known, the form members create a solid barrier that maintains the concrete mixture 16 in place and forces the concrete mixture 16 to assume a desired external boundary configuration. The form members may be fabricated from plywood, plastic, aluminum, steel, or other materials known in the art.

Optionally, and depending on the requirements of the work site or the use of the concrete at the site, after preparing the forms for the decorative concrete structure 10, reinforcing members 14 such as rebar or a wire mesh may be used to increase the resultant strength of the decorative concrete structure 10. The reinforcing members 14 provide increased strength and/or mitigate the likelihood of cracking within the decorative concrete structure 10. The reinforcement members 14 may be positioned upon conventional concrete chairs disposed over the layer of fill sand 12 to define a lattice framework, or other arrangements known by those skilled in the art.

After the reinforcing members 14 are placed, should the reinforcing members be required or optionally chosen, a conventional concrete mixture 16 is poured within the forms. The concrete mixture 16 is preferably poured to define a depth of approximately 3.5-4.0 inches, however, other depths are also contemplated. Although variations in the concrete mixture 16 are contemplated, the preferred concrete mixture 16 comprises 70% sand and 30% aggregate combined with portland cement preferably (2,000 pounds per square inch) or (3,000 pounds per square inch). Further, depending on desired aesthetics of the exposed surface 18, an integral color additive may be added to the concrete mixture 16 to achieve the desired state.

After the concrete mixture 16 has been poured, the top surface of the concrete mixture 16 is screeded to produce a flat surface that defines the exposed top surface 18. The top surface 18 of the concrete mixture 16 is screeded to remove excess concrete and to bring the top surface of the concrete mixture 16 to a desired plane or grade determined by the form members.

After screeding the concrete mixture 16 to the desired plane or grade, the exposed surface 18 may be surface finished with a conventional finishing tool to dispose a quantity of the cement/fine paste derived from the concrete mixture 16 at the exposed surface 18 thereof. For example, a float tool such as a bull float 17 or vibrating bull float may be used to create a smooth and flat upper surface and to remove surface imperfections. In addition to bringing up the appropriate amount of cement/fine paste, the float may seal the exposed surface 18 of the concrete mixture 16. An exemplary metal bull float is sold under the trademark HAL200 by the Lievers Holland Co. although other floats are contemplated herein.

After finishing with the float tool 17, a conventional trowel tool may be applied to the exposed surface 18. The troweling may be accomplished by a mechanical trowel machine or manually by a hand trowel.

In an optional step, while the exposed surface 18 of the concrete mixture 16 is still in a plastic state, fine sand or aggregate, or a combination thereof 22 may be broadcast over the exposed surface. The fine sand, aggregate, or combination thereof 22, may be of any given color or texture, as required to produce the desired finish appearance 24. Further, it is contemplated that various combinations of color, texture, or other characteristics of the fine sand may be variously created in order to accurately simulate, for example, quarried stone. Examples of such methods are known in the art and are disclosed, for example, in U.S. Pat. Nos. 8,079,775 7,781,019, 7,614,820, and 5,794,401 to Shaw et al., the contents of which are expressly incorporated herein by reference.

It is further contemplated that the exposed surface may be worked first with a conventional brooming tool 24 to create patterns in the exposed surface that resemble wood grain.

According to an implementation of the present invention, it is contemplated that the broadcasting of the fine sand and the aggregate may be performed utilizing pneumatic equipment. The pneumatic equipment may allow the operator to produce a randomized pattern or a design corresponding to a particular natural material. Thus, the appearance of the exposed surface may be enhanced utilizing other tools such as pneumatic equipment.

After being broadcast upon the exposed surface of the concrete mixture, the fine sand and the aggregate are mixed or worked 23 into the exposed surface 18 of the concrete mixture 16, and more particularly are mixed into the cement/fine paste of the exposed surface. This may be accomplished utilizing a power trowel. However, it is contemplated that the mixing may be accomplished utilizing other devices known in the art.

Once the exposed top surface has been finished with any of the foregoing methods, the concrete mixture is allowed to harden 25 which typically occurs within twenty-four to forty-eight hours after the concrete is poured.

In an optional step, after the concrete has hardened, the exposed surface may be acid washed or sandblasted 35 to expose the aggregates within the concrete. Essentially, the sand blasting erodes the surface layer of the concrete, but sand blasting can do more depending on the chosen grade of sand blasting.

After hardening of the concrete mixture 16, and optional application of one or none of the above finish techniques, the exposed top surface 18 is treated by applying an abrasive or abrasive member in a side-to-side sweeping reciprocal or in a rotary motion. The side-to-side sweeping reciprocal motion is indicated by the arrows on either side of the machine 100 in FIG. 3. The abrasive may be sandpaper, emery cloths or honing stones, or similar abrasive discs or pads 40 to achieve the desired uniform finish appearance 24. The abrasive may have any one of varying degrees of abrasiveness in order to treat the exposed surface and achieve the desired finish appearance 24. For example, depending on the techniques used on the concrete used prior to and during hardening, a more or less abrasive material may be required to achieve the desired finish appearance 24. A range of abrasiveness exemplified by 10 grit to 4000 grit sandpaper is contemplated. For most applications, 20 grit sandpaper is used, but other grades of sandpaper as well as other abrasives are contemplated depending upon the surface finish applied in the previous step and the desired end finish.

Figure 3:
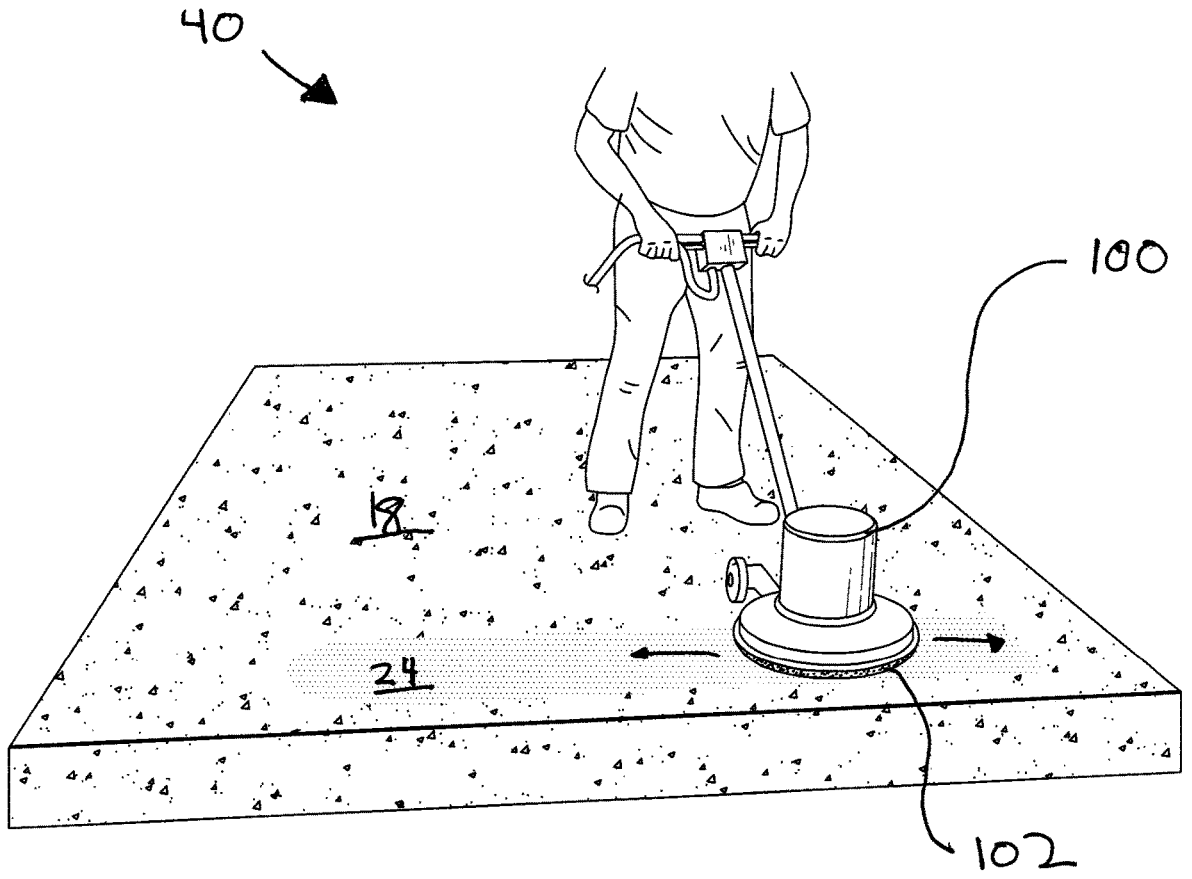
FIG. 3 illustrates the step of working the concrete with an abrasive material.

As shown in FIG. 3, the sandpaper may be worked across the exposed surface either by hand or machine 100. Conventional machines that may be used in working the exposed surface may include a rotary polisher, or rotary sander, a belt sander or a reciprocating sander. Any of the abrasives may alternatively be worked by hand, including the use of hand tools, for example, a sanding block, or handheld power tools, such as a handheld reciprocating sander or handheld belt sander.

Typically, the machines will be used with sandpaper manufactured for attachment to the machine. The sandpaper may be in either in disk, belt or sheet formats, as required by the configuration of the machine. The abrasive particles embedded in the sandpaper act to either remove or fracture small sand particles in the exposed surface 18, which creates the more uniform final finish for the exposed surface, giving it the desired finish appearance 24. However, either purpose manufactured disks, belts, or sheets of alternate materials, or custom manufactured combinations of materials and formats may be used as well. For example, a user may manufacture a belt emery cloth for use in a belt sander.

Further, a process of working the exposed surface with progressive abrasives is contemplated. Again, depending on the techniques used while the concrete is still plastic, more or fewer steps may be required. For example, in a first step, the exposed surface may be worked with 10 grit sandpaper, in a next step, the exposed surface is worked with a finer grit sandpaper, for example, 80 grit. In a final step, the exposed surface is worked with an even finer grit sandpaper, for example, 100 grit. In using this method, the particles removed or fractured in each step become increasingly smaller, and the exposed surface takes on a more and more uniform appearance. Depending on the starting point of the exposed surface due to the various techniques used while the concrete was still plastic, only one or two steps, instead of three, may be required.

The preferred embodiment for large, essentially flat areas of exposed surface uses a rotary polisher or rotary sander and a disk 102 of sandpaper, but, as noted above, other machines and shapes of abrasive may be used, including belt and reciprocating sanders, with belts, squares or rectangles of sandpaper or other abrasives. The use of the rotary polisher or rotary sander, especially where the sandpaper is applied either in a generally rotary or side-to-side sweeping reciprocal motion, lends to the easiest achievement of a uniform surface.

Some circumstances may render the use of a rotary machine either impossible or impractical. In such circumstances, the desired highly uniform appearance may be best achieved by the use of alternative machines or working the surface by hand. For example, conventional belt or reciprocal sanders may be used on the treads of a concrete stairway. In such circumstances, the best motion to work the exposed surface may be a one-way or back-and-forth linear reciprocating motion. The vertical surfaces of the risers of the stairway may be best worked by hand, or by handheld power tools. Working the exposed surface by hand or with handheld tools allows for a wide range of techniques, as the overall motions tend to be smaller, and are more easily controlled. Thus, any time the exposed surface is worked by hand, as in the case of the risers, the circular or reciprocating sweeping motions of the rotary polisher or rotary sander, or the more linear techniques discussed in conjunction with the belt or reciprocating sander may be used.

In an alternative method, large flat areas may be worked by machine, and then areas determined by the user to require additional working may be done by either machine or hand. For example, it is known by one of ordinary skill in the art that when using a rotary polisher or rotary sander, linear boarders, such as edges where the concrete ends, and landscaping begins, or where the exposed surface abuts a structure, are difficult to work uniformly. After using one machine, such as a rotary polisher or rotary sander in such an area, anther machine, for example, a belt sander may be used to work any exposed surface requiring additional working to achieve a highly uniform finish. Alternatively, such areas may be worked by hand to ensure that crossover, and the corresponding possibility of overworking certain areas relative to immediately adjacent areas, is minimized.

As another alternative, different techniques may be applied in adjacent areas to create a pattern. For example, where there may be conventional saw cuts made in the surface of the concrete in order to control cracking. One area defined within certain saw cut borders may be treated to a finish appearance using a chosen grade of abrasive, while an adjacent area, defined by at least one common saw cut, is finished to a different finish appearance using a rougher or finer grade of abrasive.

Again with reference to FIGS. 1 and 2, following sanding the exposed surface 18, an optional concrete stain 45 or sealer or protective coat 50 may be applied to achieve a final desired appearance 24 and texture.

As illustrated in FIG. 2, the concrete mixture may be cured utilizing water alone 70, as opposed to chemical curing agents in order to avoid staining of the exposed surface. Such water curing may typically be facilitated through the use of a conventional fogger or soaker hose. After a prescribed period of time (e.g., 30 days after initiating the curing process) any surface residue present on the exposed surface is removed by conventional power washing 75 with a ninety percent (90%) steam and ten percent (10%) muriatic acid mixture which is applied by a power washer via a high pressure nozzle.

The above description is given by way of example, and not limitation. Given the above disclosure, one skilled in the art could devise variations that are within the scope and spirit of the invention disclosed herein, including various ways of cutting into the exposed surface 12 to create a pattern that resembles planks found in conventional natural wood decks. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of forming a decorative concrete slab having a highly uniform exposed surface, comprising:
   pouring a concrete mixture over a subgrade, the concrete mixture defining an exposed top surface when poured;
   finishing the exposed top surface;
   allowing the concrete to harden;
   working the exposed top surface with an abrasive to roughen the top surface and form a highly visually uniform exposed top surface; and
   applying a surface retarder to the exposed top surface after the working with the abrasive.

2. The method of claim 1, further comprising the steps of washing a surface film, hardening the slab with water, and power washing the slab.

3. The method of claim 1, wherein the working step includes sand blasting.

4. The method of claim 1, further comprising acid washing after allowing the concrete to harden.

5. The method of claim 1, wherein finishing the exposed surface comprises applying aggregate.

6. The method of claim 1, wherein the abrasive is sandpaper.

7. The method of claim 1, wherein working the exposed surface with an abrasive is done with a machine.

8. The method of claim 1, wherein working the exposed surface with an abrasive is done by hand.

9. The method of claim 7, wherein finishing the exposed surface comprises applying fine sand.

10. The method of claim 1, wherein finishing the exposed surface comprises applying a mixture of fine sand and aggregate.

11. The method of claim 1 further comprising the step of applying a stain after working the exposed concrete surface with an abrasive.

12. The method of claim 1 further comprising the steps of:

preparing a concrete form for the decorative concrete slab, the concrete form defining a boundary of the decorative concrete slab; and applying a surface retarder after working the exposed surface with an abrasive.

13. The method of claim 12 further comprising forming a vapor barrier after applying the surface retarder.

\* \* \* \* \*